Patented May 8, 1934

1,957,688

UNITED STATES PATENT OFFICE 1,957,688

TREATMENT OF GRAIN PRODUCTS

Morris J. Blish, Lincoln, Nebr., assignor to General Mills, Inc., Minneapolis, Minn., a corporation of Delaware No Drawing. Application June 22, 1929, Serial No. 373,056

8 Claims. (Cl. 99—10)

This invention relates to the treatment of grains and grain products by means of certain chemical agents for the purpose of modifying its breadmaking characteristics, and to the modified grain products resulting from such treatment. The invention is particularly applicable to wheat and wheat products. The treatment may be applied either to the grain itself, the flour milled therefrom, or the dough made from the flour.

Flours from different sources vary considerably in their breadmaking characteristics and, therefore require different treatments in order that the flour may be converted into good bread. With some flours, it is difficult to make good bread by any treatment; and in the case of many flours, the variations of treatment required to make good bread are so great that they are not suitable for use in large baking establishments where standardized processes of manipulation and baking are employed. According to the present invention, the breadmaking characteristics of many flours are materially improved, especially those natural flours which resemble overaged or overbleached flours in having a low fermentation tolerance.

It is customary to treat flour with chemical agents for the purpose of whitening its color. Such treatments are usually carried out in the mill but may in some instances be carried out in the bake shop.

The chemical agents used for this purpose are of a character which tend directly or indirectly to promote oxidation and for convenience such agents will be hereinafter referred to as oxidizing agents. Common examples of such chemicals are nitrogen trichloride, chlorine, nitrosyl chloride, benzoyl peroxide, calcium peroxide, potassium bromate, ammonium or potassium persulphate, etc. Many flours are subjected to the combined effect of several of these agents before they are finally converted into bread. Treatment with these agents usually affects not only the color of the flour but also its breadmaking characteristics. While the breadmaking characteristics of certain flours subjected to proper treatment with oxidizing agents may be improved, in the case of other flours treatment with oxidizing agents sufficient to obtain a satisfactory color injuriously affects the breadmaking characteristics of the flour. Also in the case of all flours there is risk of occasionally overtreating a batch with oxidizing agents with the result that its breadmaking characteristics are seriously injured.

According to the present invention, the effects produced upon the breadmaking characteristics of flour by such oxidizing agents may be reversed and the breadmaking characteristics controlled to suit requirements without injurious effect upon the color of the flour or bread.

The present invention involves treating the flour with agents which directly or indirectly cause a reducing effect. Those sulphur compounds which contain sulphur in a more or less reduced state are particularly useful for the purpose; for example, sulphides, sulphites, thiosulphates, sulphur dioxide, etc. Sodium sulphite and carbon disulphide are convenient agents. Other reducing agents, for instance, nitrites, may be used but apparently are not as desirable as the sulphur compounds. The sulphur compounds are cheap and effective in such small amounts as to be difficult to detect after use by chemical analysis and in such quantities as are nutritionally harmless. They may be applied either to the grain or to the flour in the mill or to the dough in the bake shop. They may be used either before or after the treatment of the flour with oxidizing agents. Furthermore, the effects produced upon the breadmaking characteristics of flour by reducing and oxidizing agents are reversible so that flour which has been injured by overtreatment with either one may be restored to optimum condition by subsequent treatment with the other.

One of the simplest methods of applying this invention is to treat wheat in tempering. For example, wheat may be tempered with a 1% or 2% solution of sodium sulphite, instead of water alone, using, for example, .01 to .1 pound of sodium sulphite per one hundred pounds of wheat. The flour made from such treated wheat may subsequently be treated with oxidizing agents for improving its color. While such treatment of the wheat does not materially affect the influence of oxidizing agents upon the color of the flour, it diminishes the risk of over oxidation damaging its breadmaking characteristics, thereby permitting maximum color removal.

Another method of applying this invention is to treat flour during or after the milling and before or after the application of oxidizing agents. The quantity of reducing agent used depends upon the degree of effect desired but in any case is relatively minute. For example, from .0005 to .005 pound of sodium sulphite to one hundred pounds of flour will usually be sufficient to produce the desired effect. The sodium sulphite may conveniently be mixed with the flour in finely powdered form.

Again the invention may be applied by treating dough made from the flour. The proportions of reducing agent used for the treatment of dough, based on the flour in the dough, may be substantially the same as those used for treating flour.

An alternative method of treatment is to expose the grain or flour to the effects of small quantities of gaseous reducing agents, such, for example, as sulphur dioxide or carbon disulphide in a gaseous state. Another method is to blend a portion of flour, which has been treated with an excess reducing agent, with a larger quantity of flour requiring treatment.

As above noted, flours from different sources or which have been subjected to different degrees of oxidizing treatment vary widely in the amount of reducing agent needed to yield the best breadmaking characteristics for any particular breakmaking procedure. Therefore, in carrying out the process, it is desirable to determine for each type of batch to be treated the optimum proportions of reducing agent. This may be easily established by applying varying proportions of reducing agent to a few laboratory samples of the particular material to be treated and examining bread baked therefrom. The amount of reducing agent needed will in all cases be a small fraction of a per cent. of the flour treated.

It will be obvious from the foregoing that the invention may be employed in various ways without departing from its spirit and scope.

By the term "grain products", as used in the following claims, it is intended to include the grain itself as well as the materials prepared from the grain, such as flour, dough or baking products. The term "bread-making characteristics" is used in its broad sense in this industry and includes the characteristics which are of value in the making of bread and other baked product from wheat or other grain products. The expression "harmless reducing agent" as used in the claims is intended to include all reducing agents which are harmless in the amounts used.

What I claim is:

1. The method of improving the breadmaking characteristics of overoxidized grain products, which comprises treating the same with a harmless reducing agent.

2. The method according to claim 1 in which the reducing agent is a sulphur compound.

3. The method of improving the color and breadmaking characteristics of wheat flour, which comprises treating the wheat flour with an amount of oxidizing agent to bring about maximum improvement of color and subsequently treating the wheat flour with a harmless reducing agent to control the breadmaking characteristics of the flour.

4. A method of preparing grain products comprising subjecting the grain product to a regulated reduction by a harmless reducing agent to give the desired breadmaking characteristics and subsequently treating the grain product with an oxidizing agent to improve its color.

5. A method of improving the breadmaking characteristics of overoxidized wheat flour, which comprises treating the same with a harmless reducing agent.

6. A method of preparing wheat flour comprising subjecting the wheat flour to a regulated reduction by a harmless reducing agent to give the desired breadmaking characteristics and subsequently treating the wheat flour with an oxidizing agent to improve its color.

7. A method of preparing grain products comprising subjecting the grain to a regulated reduction by tempering it with a solution containing a harmless reducing agent to give the desired breadmaking characteristics and subsequently treating the grain product with an oxidizing agent to improve its color.

8. A method as defined in claim 7 in which wheat is tempered with a 1 to 2% solution of sodium sulphite.

MORRIS J. BLISH.